(12) United States Patent
Valenti, Jr.

(10) Patent No.: US 6,971,200 B2
(45) Date of Patent: Dec. 6, 2005

(54) FORM HAVING A REMOVABLE WRISTBAND AND LABELS

(75) Inventor: F. Paul Valenti, Jr., Barrington, IL (US)

(73) Assignee: Chicago Tag & Label, Libertyville, IL (US)

( * ) Notice: Subject to any disclaimer, the term of this patent is extended or adjusted under 35 U.S.C. 154(b) by 0 days.

(21) Appl. No.: 10/637,711

(22) Filed: Aug. 8, 2003

(65) Prior Publication Data

US 2004/0128892 A1    Jul. 8, 2004

Related U.S. Application Data

(60) Provisional application No. 60/410,772, filed on Sep. 13, 2002.

(51) Int. Cl.$^7$ ................................................. A44C 5/00
(52) U.S. Cl. ........................ 40/633; 283/75; 340/572.1
(58) Field of Search ............................ 40/633; 283/74, 283/75; 340/572.1, 572.4, 572.7, 572.8

(56) References Cited

U.S. PATENT DOCUMENTS

| | | | | |
|---|---|---|---|---|
| 5,347,263 | A | | 9/1994 | Carroll et al. ............. 340/5.61 |
| 5,653,472 | A | | 8/1997 | Huddleston et al. .......... 283/75 |
| 5,933,993 | A | * | 8/1999 | Riley ........................... 40/633 |
| 5,973,600 | A | * | 10/1999 | Mosher, Jr. .............. 340/572.8 |
| 6,000,160 | A | * | 12/1999 | Riley ........................... 40/633 |
| 6,016,618 | A | * | 1/2000 | Attia et al. ................... 40/633 |
| 6,067,739 | A | * | 5/2000 | Riley ........................... 40/633 |
| 6,100,804 | A | * | 8/2000 | Brady et al. ............. 340/572.7 |
| 6,181,287 | B1 | * | 1/2001 | Beigel ........................ 343/741 |
| 6,438,881 | B1 | * | 8/2002 | Riley ........................... 40/633 |
| 6,496,112 | B1 | | 12/2002 | Vega ....................... 340/572.1 |
| 6,510,634 | B1 | * | 1/2003 | Riley ........................... 40/633 |
| 6,641,048 | B1 | * | 11/2003 | Schintz et al. ............. 235/487 |
| 6,836,215 | B1 | * | 12/2004 | Laurash et al. .......... 340/572.1 |

* cited by examiner

Primary Examiner—Lars A. Olson
(74) Attorney, Agent, or Firm—Wallenstein Wagner & Rockey, Ltd

(57) ABSTRACT

A printable form is disclosed having a first layer including a detachable portion in the form of a wristband with an incorporated electronic identifier. A second layer is bonded to the first layer by an adhesive and has labels die cut into it. The bond between the first layer and the die cut labels is a releaseable bond allowing the labels and the adhesive contained thereon to be removed from the first layer.

12 Claims, 5 Drawing Sheets

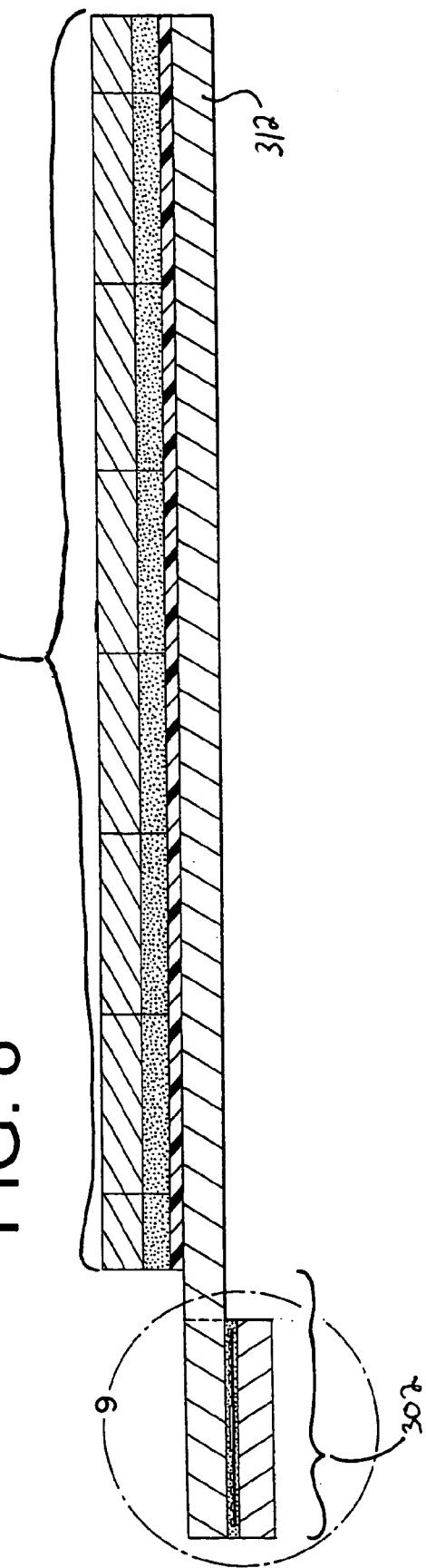
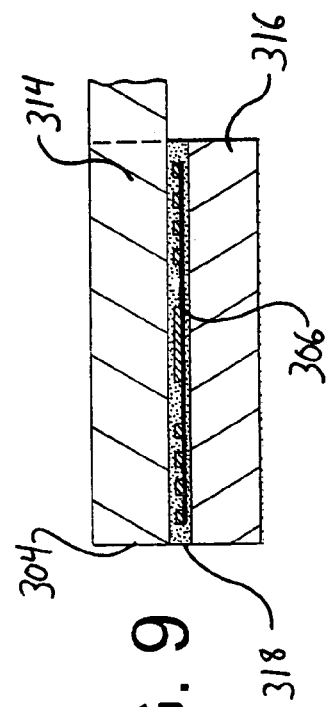

FORM HAVING A REMOVABLE WRISTBAND AND LABELS

RELATED REFERENCES

The present invention claims priority of U.S. Provisional Patent Application No. 60/410,772 filed on Sep. 13, 2002.

FIELD OF THE INVENTION

The present invention relates to printable forms, and more particularly to a printable form having removable labels which incorporates a removable wristband.

BACKGROUND OF THE INVENTION

Identification wristbands are commonly used in a hospital or other setting to promote the easy identification of patients or other wearers. In the instance of a hospital use, a patient is generally provided with an identification wristband that is secured about the wrist of the patient upon admission to the hospital. In addition, a number of labels for use in identifying fluid samples, medications, charts, folders, papers and other common hospital objects specific to an admitted patient are often printed when a patient is admitted.

Often, the labels and wristbands are printed separately. The wristband is placed on the patient, while the labels are put into a patient chart, or otherwise saved for later use. However, in an effort to streamline patient admission procedures, and in light of the widespread use and low cost of computer driven printers such as laser printers, it has become desirable to print the labels and wristbands in a single step.

U.S. Pat. No. 5,653,472 entitled, "Form Having Detachable Wristband and Labels" discloses a form having detachable labels and a wristband. The form includes a face ply adhered to a liner ply by a pressure sensitive adhesive. The face ply includes a first portion and a second portion where the first portion is die cut to form a wristband and the second portion is die cut to form a series of detachable labels. A problem associated with this design is that the die cut wristband tends to become separated from the form too easily. This is an issue in that it is desirable that the form be printable in a single pass through a laser, or other type of printer. However, the edges of the die cut wristband may become snagged on the mechanism of the printer and become lodged in the printer, causing a printer malfunction.

Other problems associated with prior art printable forms which include a wristband and labels is that the wristbands are not durable enough to withstand adverse conditions, which may include exposure to moisture, abrasion, and tearing forces. In such conditions, printed material may be smeared or scraped off. In addition, a direct line of sight is required to read any information which may be printed onto the wristband.

The present invention is designed to solve these and other problems.

BRIEF SUMMARY OF THE INVENTION

A first aspect of the present invention provides a printable form having a first portion including a detachable wristband with an incorporated electronic identifier. The printable form includes a second portion connected to the first portion having a liner and detachable labels mounted on the liner.

According to another aspect of the invention, a printable form includes a first layer having a detachable portion in the form of a wristband. An electronic identifier is incorporated into the wristband. A second layer of material is bonded to the first layer by an adhesive, and the second layer has labels die cut from it. The bond between the first layer and the die cut labels is a releaseable bond allowing the labels and the adhesive contained thereon to be removed from the first layer.

Other features and advantages of the invention will be apparent from the following specification taken in conjunction with the following drawings.

BRIEF DESCRIPTION OF THE SEVERAL VIEWS OF THE DRAWINGS

To understand the present invention, it will now be described by way of example, with reference to the accompanying drawings in which:

FIG. 8 is a cross-sectional view of the form of FIG. 7 along line 8; and,

FIG. 9 is a detailed cross-sectional view of the form of FIG. 8 in area 9.

DETAILED DESCRIPTION OF THE INVENTION

Figure 1:
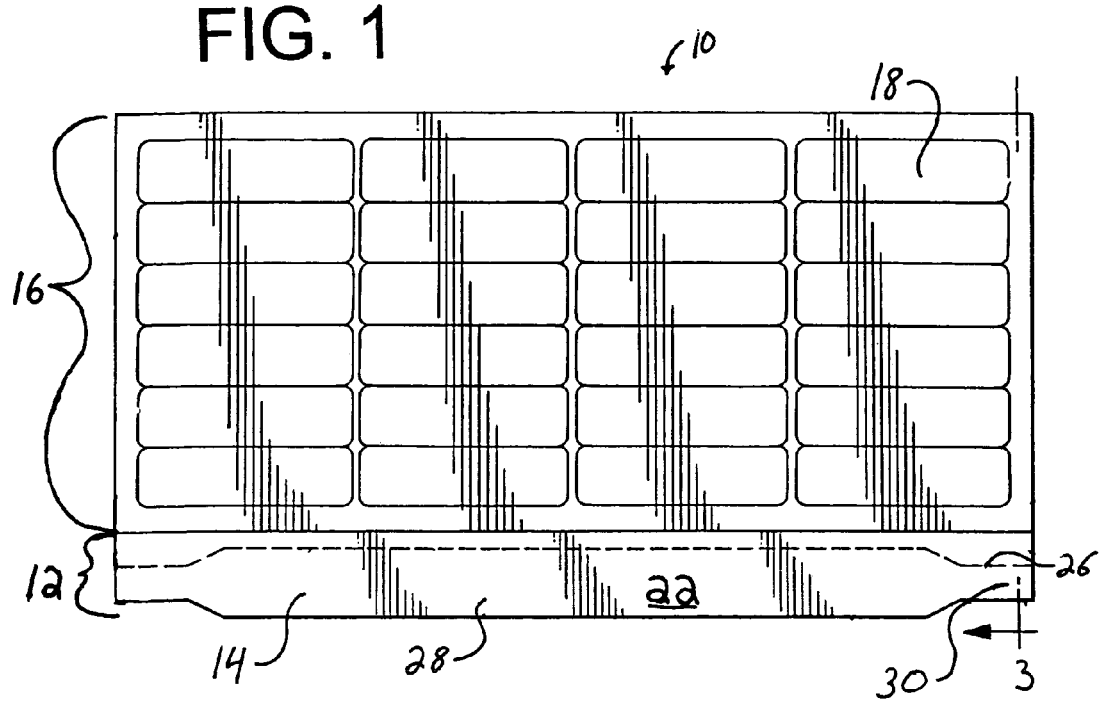
FIG. 1 is a top view of a printable form according to one embodiment of the present invention.

While the invention is susceptible of embodiment in may different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

Figure 2:
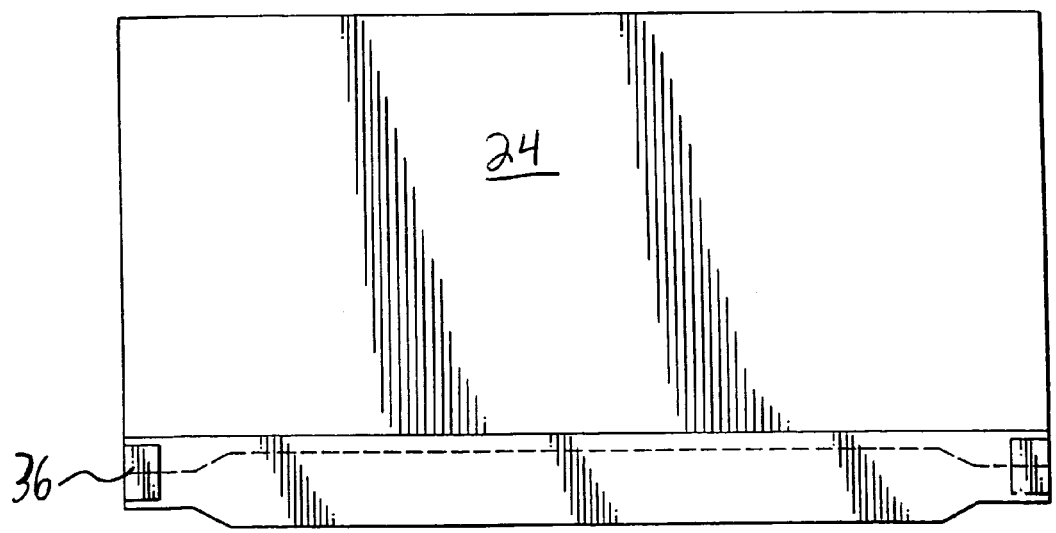
FIG. 2 is a bottom view of the form of FIG. 1.
Figure 3:
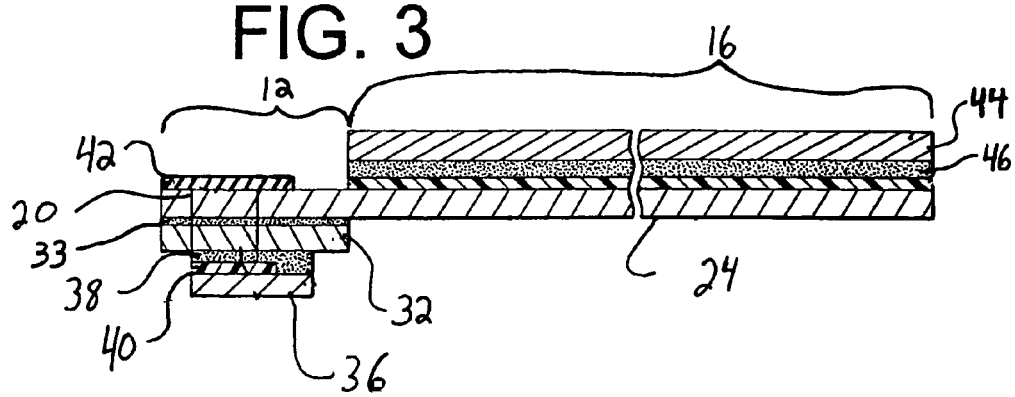
FIG. 3 is a cross-sectional view of the form of FIG. 1 along line 3.

One example embodiment of a printable form is shown generally as reference numeral 10 of FIGS. 1–3. FIG. 1 shows a top view of the printable form, FIG. 2 a bottom view of the form, and FIG. 3 a cross-sectional view of the form along line 3 of FIG. 1.

The printable form 10 generally includes a first portion 12 including a wristband 14, and a second portion 16 including labels 18.

The first portion 12 generally comprises a first layer 20 having a first major surface 22 and a second major surface 24. The first layer 20 generally includes a perforation 26 in the general shape of a wristband 14. The wristband 14 is generally located along a periphery of the form 10. The shape of the wristband 14 generally includes a body portion 28 and two end portions 30. The end portions 30 are generally tapered from the body portion 28.

The first portion also generally includes a reinforcing layer 32 of material as shown in FIG. 3. The reinforcing layer 32 is generally permanently bonded by a layer of adhesive 33 to the second major surface 24 of the first layer 20. The reinforcing layer 32 is preferably bonded to the first layer 20 such that it covers substantially one entire surface of the wristband 14. The perforations 26 that define the wristband 14 generally continue through the reinforcing layer 32 such that the reinforcing layer 32 forms a part of the wristband 14, and provides strength to the wristband 14 both when it is attached to the form 10, and after removal of the wristband 14 from the form 10.

Many different materials may be used as a reinforcing material. The preferred material is generally water resistant and has good strength to prevent tearing of the wristband. Synthetic materials are generally preferred. However, paper can also be used, particularly if the paper is coated with a water resistant coating.

In this embodiment, the reinforcing layer 32 is bonded to, and covers an extent of the second major surface 24 of the first layer 20 which is slightly larger than the size of the wristband 14. When the wristband 14 is removed, a portion of the reinforcing layer 32 remains bonded to the non-wristband portion of the first layer 12.

In this embodiment, release tabs 36 are bonded to the reinforcing layer 32. The release tabs 36 cover adhesive 38 located on the reinforcing layer 32 proximate to one or both of the ends 30 of the wristband 14. There are generally two release tabs 36 and two areas of adhesive 38, but in some embodiments only one end of the wristband may have adhesive and a release tab. The release tab 36 covers the adhesive 38 located on the reinforcing layer 32 of the wristband 14 such that when the wristband 14 is removed from the form 10, the adhesive 38 retained on an end 30 of the wristband 14 is exposed, and can be used to secure the wristband 14 around a limb of a patient or other user.

The release tab 36 has a release coating 40 which covers that portion of the adhesive 38 which is on the wristband 14. The adhesive 38 in this embodiment preferably also covers a portion of the reinforcing layer 32 which does not form a portion of the wristband 14. When the line of perforation of weakened material securing the wristband 14 to the form 10 is torn, and the wristband 14 removed, the tabs 36 preferably remain bonded to the reinforcing layer 32 which does not from a portion of the wristband 14. The release tabs 36, therefore, are separated from the wristband 18, and remain bonded to the form 10.

One benefit of this arrangement is that the perforation 26 securely fastens the wristband 14 to the remainder of the form and prevents it from inadvertently becoming separated from the form during printing or other handling. However, it also provides ease of use because in a single step the wristband 14 can be removed from the form such that the adhesive 38 is exposed and the wristband 14 is prepared for application.

The wristband 14 of the first portion 12 may include a coating 42. The coating 42 generally covers the first major surface 22 of the wristband 14, and is preferably a performance enhancing coating. Coatings which improve the printability or weatherability of the wristband are preferred. The coating generally improves the water resistance of the wristband. A coating may also prevent wicking of ink applied to the wristband, or otherwise improve the printability of the wristband. A coating may optionally be applied to other printable surfaces of the form, including the labels, to improve the weatherability and printability of the printable surfaces. Such coating are well known in the art.

The second portion 16 of the form 10 includes removable labels 18. The removable labels 18 are generally part of a second layer 44 of a printable material. As shown in FIG. 1, the removable labels 18 are die cut into the second layer 44. FIG. 1 shows a plurality of similarly sized, generally rectangular labels 18, but labels of different sizes and shapes may optionally be die cut into the second layer 44.

The second layer 44 is generally removably bonded to the first major surface 22 of the first layer 20 by an adhesive 46. A release coating 48, which is generally applied directly to the first major surface 22 of the first layer 20, allows the labels 18 to be removed as desired. The release coating 48 is preferably a silicone coating. The wristband 14 is preferably free of the silicone release coating to provide a printable surface.

The material used for the first layer 20 and second layer 44 is generally paper. The paper used for the first layer is preferably super-calendared to improve weatherability of the wristband 14, which is generally formed from the first layer 20. While paper is the preferred material, numerous other materials may be used. Many synthetic materials provide benefits such as improved durability, strength, and weatherability. These materials are well known in the art, and may be substituted for the preferred paper material as desired.

Figure 4:
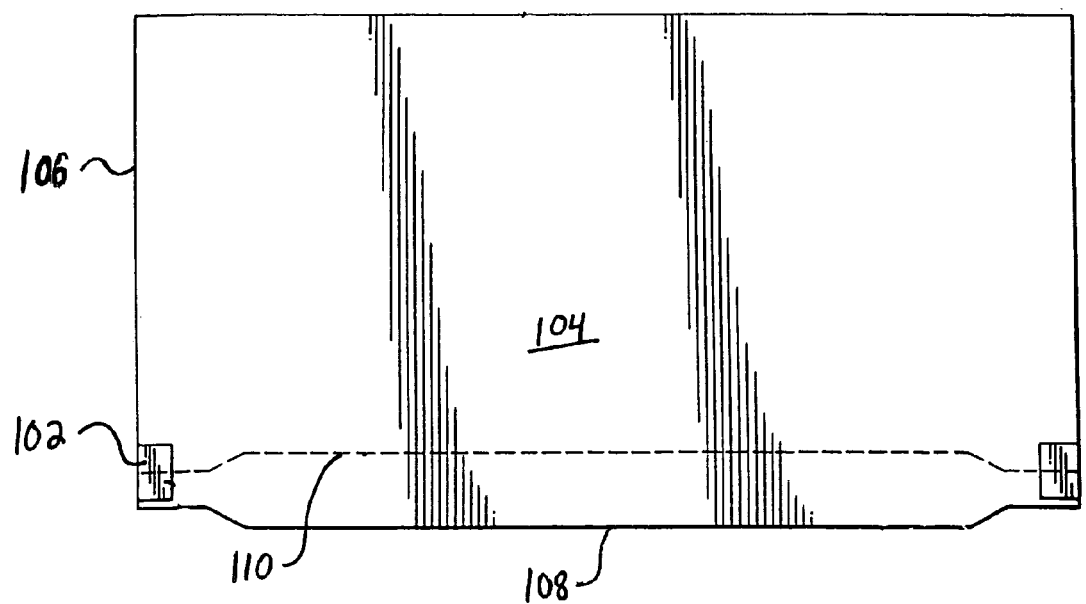
FIG. 4 is a bottom view of a form according to another embodiment of the present invention.

Another embodiment of a form according to the present invention is shown generally in FIG. 4 as reference numeral 100. The form 100 is generally the same as the first embodiment described above except it does not include a reinforcing layer. FIG. 4 shows a bottom view of a form 100 according to this embodiment. The top of a form according to this embodiment is generally the same as that shown in FIG. 1. However, the bottom of the form 100 is different. The absence of a reinforcing layer means release tabs 102 are adhered directly to a major surface 104 of the first layer 106 of material. The tabs 102 again include a release coating which covers that portion of the tab 102 which is bonded to the detachable wristband 108. When the wristband 108 is torn from the form 100 along a perforated line 110, the tabs 102 remain bonded to the form 100.

The form 100 of this embodiment may include a synthetic material as the first layer 106 of material. Because no reinforcing material is provided on the wristband 108, it may be beneficial to use the synthetic material for the first layer 106, from which the wristband 108 is formed. The synthetic material used will generally have sufficient strength and durability such that a single layer of material can be used as the wristband 108. A coating may be used on the synthetic material to improve printability.

Alternatively, paper may be used to form the first layer 106. A coating may be applied to the top and/or bottom of the form 100 to improve the printability, weatherability, and durability of the form 100 or wristband 108.

Figure 5:
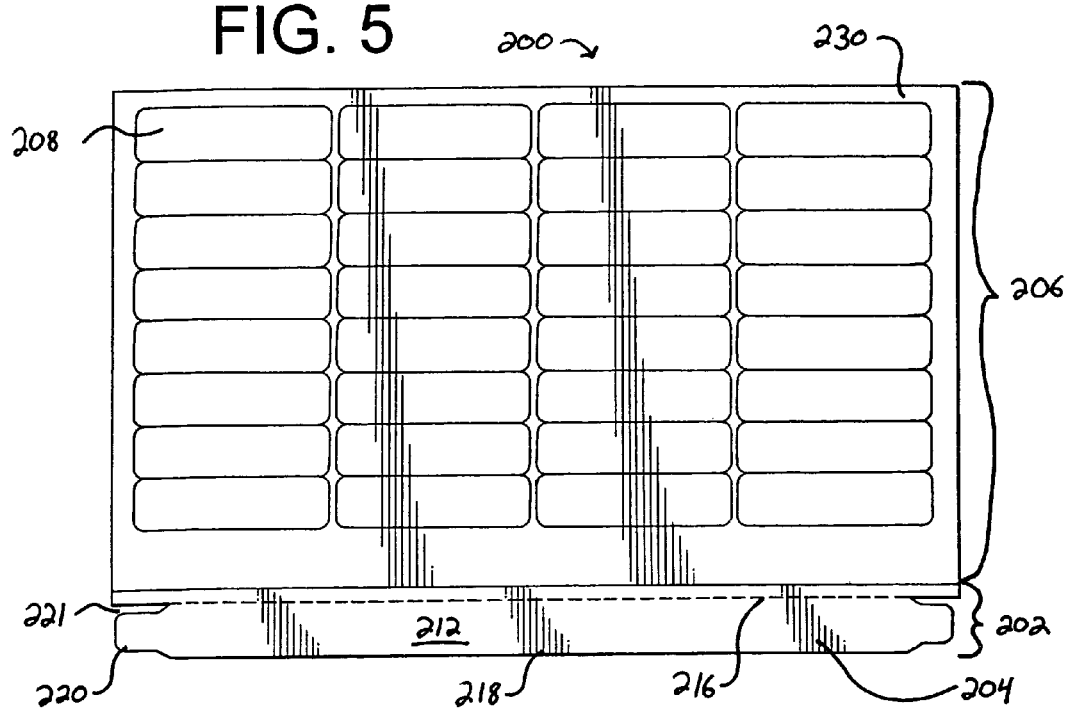
FIG. 5 is a top view of a printable form according to another embodiment of the present invention.
Figure 6:
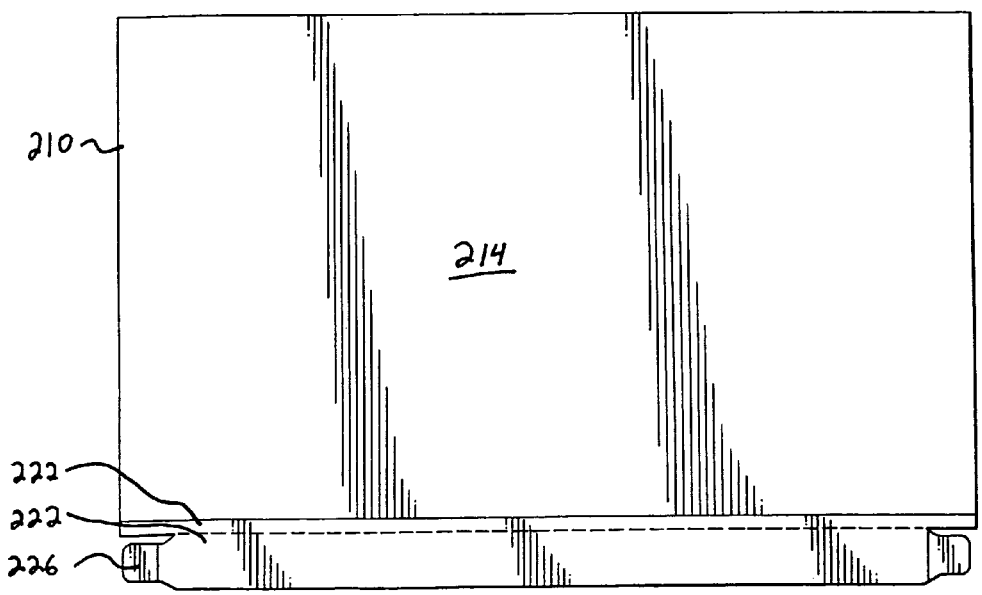
FIG. 6 is a bottom view of the form of FIG. 5.

Another embodiment of a form according to the present invention is shown in FIGS. 5 and 6 as reference numeral 200. The form 200 generally includes a first portion 202 including a wristband 204, and a second portion 206 including labels 208.

The first portion 202 generally comprises a first layer 210 having a first major surface 212 and a second major surface 214. The first layer 210 generally includes a perforation 216 in the general shape of the wristband 204. The wristband 204 is generally located along a periphery of the form 200. The shape of the wristband 204 generally includes a body portion 218 and two end portions 220. The end portions 220 are generally tapered from the body portion 218. In this embodiment, the end portions 220 of the wristband 218 are separated by cutouts 221 from the remainder of the form.

The first portion 202 also generally includes a reinforcing layer 222 of material. The reinforcing layer 222 is generally permanently bonded by a layer of adhesive to the second major surface 214 of the first layer 210. The reinforcing layer 222 is preferably bonded to the first layer 210 such that it covers substantially the entire second major surface 214 of the wristband 204. The perforations which define the wristband 204 generally continue through the reinforcing layer 222 such that the reinforcing layer 222 forms a part of the wristband 204, and provides strength to the wristband 204 both when it is attached to the form 200, and after removal of the wristband 204 from the form 200. The reinforcing layer 222 is bonded to, and covers an extent of the second major surface 214 of the first layer 210 which is slightly larger than the size of the wristband 204. When the wristband 204 is removed, that portion of the reinforcing layer 222 not covering the wristband 204 generally remains bonded to the non-wristband portion of the first layer 210.

In this embodiment, release tabs 226 are bonded to the reinforcing layer 222. The release tabs 226 cover adhesive located on the reinforcing layer 222 proximate to the ends 220 of the wristband 204. There are generally two release tabs 226 and two areas of adhesive 228, but in some embodiments only one end of the wristband may have adhesive and a release tab. The release tabs 226 cover the adhesive located on the reinforcing layer 222 of the wristband 204. In this embodiment, the release tabs 226 are contained entirely on the wristband 204. When the wristband 204 is removed from the form 200, the adhesive and release tabs 226 are retained on the ends 220 of the wristband 204. The release tabs 226 may then be individually removed to expose the adhesive, which can then be used to secure the wristband 204 around a limb of a patient or other user. The release tabs 226 generally include a release coating which covers the adhesive allowing the release tabs 226 to be removed as desired.

The second portion 206 of the form 200 includes the removable labels 208. The removable labels 208 are generally part of a second layer 230 of a printable material. As shown in FIG. 5, the removable labels 208 are die cut into the second layer 230.

The second layer 230 is generally removably bonded to the first major surface 212 of the first layer 210 by an adhesive. A release coating is generally applied directly to the first major surface 212 of the first layer 210 underneath the labels 208. The release coating preferably allows the labels 208 to be removed as desired. The wristband 204 is preferably free of the release coating to provide a printable surface.

The material used for this embodiment of the form 200 is generally the same as those materials discussed in conjunction with previous embodiments. As with other embodiments, various coating may be used on various surfaces of the form 200 to improve the printability, durability, or weatherability of the form 200 and its various component parts such as the wristband 204 or labels 208.

Figure 7:
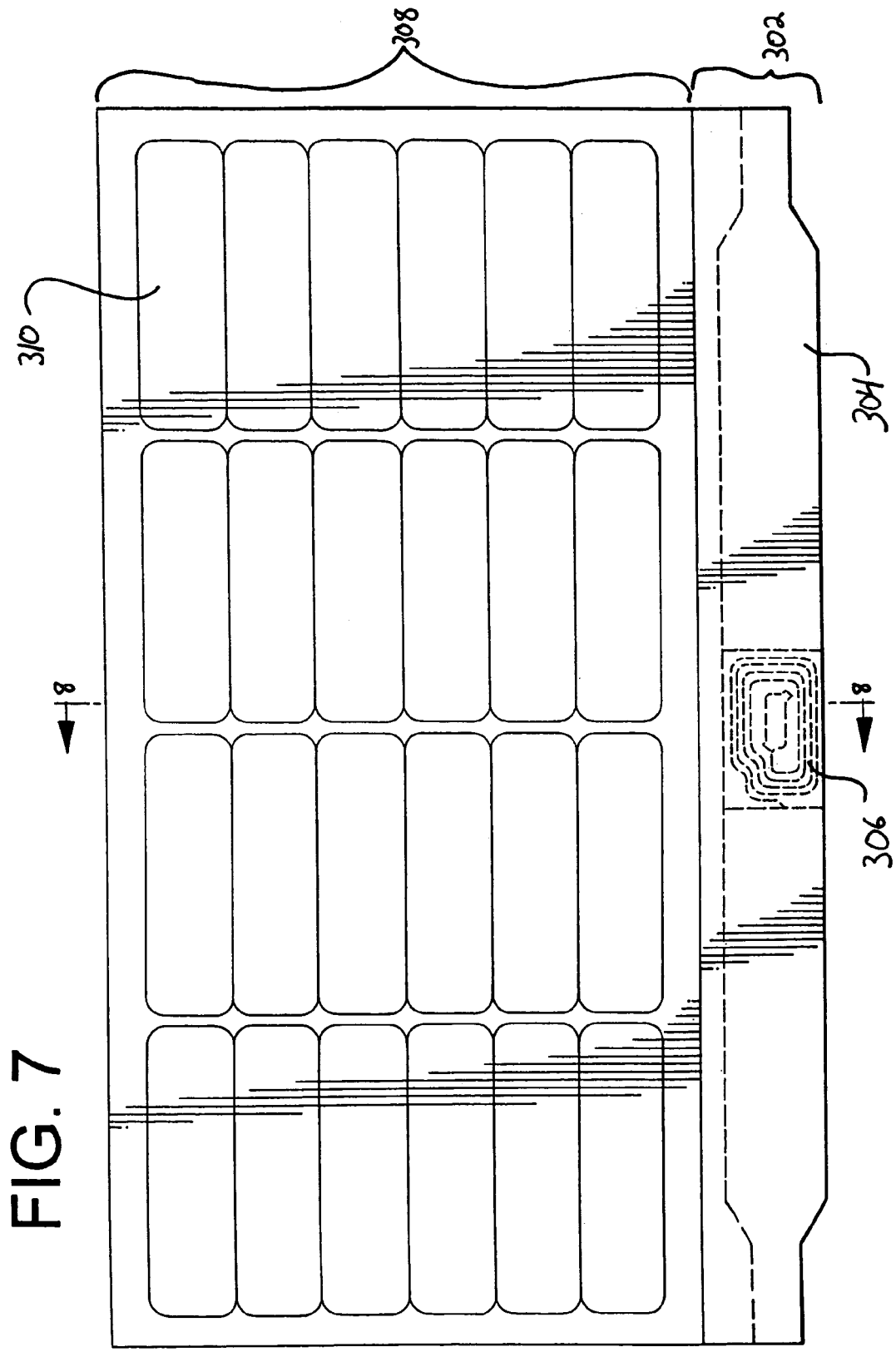
FIG. 7 is a top view of a printable form according to another embodiment of the present invention.

Another embodiment of a printable form according to the present invention is shown in FIGS. 7–9 as reference numeral 300. The form 300 generally includes a first portion 302 including a wristband 304 with an incorporated electronic identifier 306, and a second portion 308 including labels 310 mounted on a liner 312.

The first portion 302 of the form 300 is shown in detail in FIG. 9, which shows a cross-section of the wristband 304. The wristband 304 preferably includes a first layer 314 of material and a reinforcing layer 316 of material. The first layer 314 and reinforcing layer 316 are generally bonded to one another by an adhesive 318. An electronic identifier 306 is preferably located between the first layer 314 and reinforcing layer 316.

The electronic identifier 306 generally provides a means of communicating information about the wristband or its wearer. Three commonly used systems which utilize an electronic identifier, and may be incorporated into the wristband include radio frequency, electromagnetic, and acousto-magnetic systems. Depending on the system, different quantities of information may be communicated by the electronic identifier that is incorporated into the wristband. Generally, the radio frequency system is preferred because a radio frequency identification circuit may store and communicate more information. The electromagnetic and acousto-magnetic systems are often used in retail stores to prevent shoplifting, and may be beneficial incorporated into a wristband in situations where it is desirable to monitor the movement of the wristband wearer through an electronic surveillance point.

When the radio frequency system is used, the electronic identifier 306 is generally a radio frequency identification (RFID) tag. The tag generally includes an electronic circuit and an antenna. Advances in RFID tags have made such tags smaller, less expensive, provided greater read/write capabilities, greater memory, and greater read range. U.S. Pat. No. 6,496,112 B1 entitled, "Radio Frequency Identification Tag With A Programmable Circuit State," and U.S. Pat. No. 5,347,263 entitled, "Electronic Identifier Apparatus and Method Utilizing A Single Chip Microcontroller and An Antenna Coil," which are hereby incorporated by reference, describe RFID tags suitable for use in the form 300 of the present invention. Many other suitable RFID tags and labels are well known in the art and could be used in conjunction with the form 300 of the present invention.

The preferred electronic identifier 306 for use in conjunction with the present invention generally includes certain beneficial qualities. The electronic identifier 306 is preferably capable of storing identifying information that allows an individual wristband to be identified by scanning or otherwise reading the electronic identifier using a scanning or reading mechanism. The electronic identifier 306 preferably includes a read/write capability, and can preferably be programmed with identifying information. The electronic identifier reading mechanism preferably does not require a line of sight to scan or read the electronic identifier 306. The electronic identifier 306 is preferably thin enough to pass through a laser printer when it is incorporated into the form 300. The use of a flexible electronic identifier 306 may improve the operation of the wristband. Preferably, the electronic identifier does not require a battery. Each of these benefits is available using RFID technology. However, it can be appreciated that other technologies which provide the same benefits could be substituted with the same beneficial effect.

The second portion 308 of the form 300 includes the removable labels 310. The removable labels 310 are generally part of a second layer 320 of a printable material. As shown in FIG. 7, the removable labels 310 are die cut into the second layer 320.

In some embodiments, the labels may also include an incorporated electronic identifier. Labels having incorporated RFID tags are preferred.

The second layer 320 is generally removably bonded to the first layer 314 by an adhesive layer 322. A release coating 324 is generally applied directly to a first major surface 324 of the first layer 314 underneath the labels 310. The first layer 314 in this manner functions both as a liner 312 and as a detachable wristband 304. The release coating 324 preferably allows the labels 310 to be removed as desired. The wristband 304 is preferably free of the release coating to provide a printable surface.

The material used for the form 300 is generally the same as those materials discussed in conjunction with previous embodiments. As with other embodiments, various coating may be used on various surfaces of the form 300 to improve the printability, durability, or weatherability of the form 300 and its various component parts such as the wristband 304 or labels 310.

In use, a form in accordance with the present invention is typically run though a computer driven printer which prints information onto a wristband and onto individual labels of the form. The information may include information such as a patient name, blood type, or patient number. Generally, the same identifying information will be printed onto the wristband and the labels. The wristband is than separated from the form and is securely fastened around a users limb. The remainder of the form generally includes the labels die cut out of the second layer which are releaseably bonded to the first layer. The labels may be peeled from the form as desired to label, for example, patient charts, fluid samples, or medications.

The benefits of printable forms according to the present invention are numerous. The printable form travels easily through a laser printer or other type of printer because the wristband is securely attached to the remainder of the form along a perforation. The perforation extends along an extended section of the wristband preventing premature removal of the wristband from the form during the printing process.

Another benefit of a form according to the present invention is provided by the use of an electronic identifier. The use of an electronic identifier allows a wristband wearer to be identified without having a line of sight to the wristband. This is useful because in certain instances, such as in a hospital, a wristband wearer may be covering the wristband under blankets or clothing. The wearer can be identified without disturbing them using a RFID system. It may also be useful in situations where security is an issue. The wristband can be applied to a wearer, and when that wearer passes through a surveillance area, which generally includes an electronic identifier scanner or reader, an alarm may be sounded.

While the specific embodiments have been illustrated and described, numerous modifications come to mind without significantly departing from the spirit of the invention, and the scope of protection is only limited by the scope of the accompanying claims.

I claim:

1. A printable form comprising:
   a first layer having a detachable portion in the form of a wristband;
   an electronic identifier incorporated into the wristband;
   a second layer bonded to the first layer by an adhesive, said second layer having labels die cut therefrom; and
   wherein the bond between the first layer and the die cut labels is a releaseable bond allowing the labels and the adhesive contained thereon to be removed from the first layer.

2. The printable form of claim 1 further comprising an adhesive on the wristband, wherein the wristband includes two ends, and wherein the adhesive is located proximate to at least one end.

3. The printable form of claim 2 further comprising a release tab which is releasably bonded to the adhesive on the wristband end.

4. The printable form of claim 3 wherein the tab is additionally bonded to a portion of the first layer adjacent to the wristband such that when the wristband is removed the tab remains bonded to the first layer.

5. The printable form of claim 1 further comprising:
   a reinforcing material permanently bonded to the first layer, wherein the first layer includes a first major surface and a second major surface;
   wherein the second layer is bonded to the first layer on the first major surface, and the reinforcing material is bonded to the second major surface; and,
   wherein the reinforcing material forms a part of the wristband and is arranged to provide strength to the detachable wristband both before and after removal from the form.

6. The printable form of claim 5 wherein the electronic identifier is an RFID tag.

7. The printable form of claim 5 further comprising an adhesive on the wristband, wherein the wristband includes two ends and wherein the adhesive is located proximate to at least one end on the reinforcing material.

8. The printable form of claim 7 further comprising a release tab which is releasably bonded to the adhesive on the wristband end.

9. The printable form of claim 8 wherein the tab is additionally bonded to a portion of the first layer adjacent to the wristband such that when the wristband is removed the tab remains bonded to the first layer.

10. The printable form of claim 8 wherein the tab is additionally bonded to a portion of the reinforcing material which is bonded to the first layer adjacent to the wristband such that when the wristband is removed the tab remains bonded to the first layer.

11. The printable form of claim 1 further comprising a performance enhancing coating on at least one of the wristband and the labels.

12. A printable form comprising:
    a first layer having a first and second major surfaces and a detachable portion in the form of a wristband;
    an RFID tag incorporated into the wristband;
    a second layer, bonded to the first major surface of the first layer by an adhesive, said second layer having labels die cut therefrom;
    wherein the bond between the first layer and the labels is a releaseable bond allowing the labels and the adhesive contained thereon to be removed from the first layer;
    a reinforcing material permanently bonded to the second major surface of the first layer; and,
    wherein the reinforcing material forms a part of the wristband and is arranged to provide strength to the detachable wristband both before and after removal from the form.

* * * * *